(12) United States Patent
Zhang et al.

(10) Patent No.: US 9,723,006 B2
(45) Date of Patent: Aug. 1, 2017

(54) TEMPORARY PROCESS DEPRIVILEGING

(71) Applicant: McAfee, Inc., Santa Clara, CA (US)

(72) Inventors: Zheng Zhang, Portland, OR (US);
John D. Teddy, Portland, OR (US);
Craig D. Schmugar, Hillsboro, OR (US);
Erdem Aktas, Beaverton, OR (US);
Clint R. Merrill, Hillsboro, OR (US);
Kunal Mehta, Hillsboro, OR (US)

(73) Assignee: McAfee, Inc., Santa Clara, CA (US)

(*) Notice: Subject to any disclaimer, the term of this patent is extended or adjusted under 35 U.S.C. 154(b) by 73 days.

(21) Appl. No.: 14/752,902

(22) Filed: Jun. 27, 2015

(65) Prior Publication Data

US 2016/0381024 A1 Dec. 29, 2016

(51) Int. Cl.
*G06F 7/04* (2006.01)
*H04L 29/06* (2006.01)

(52) U.S. Cl.
CPC .......... *H04L 63/10* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2010/0115615 A1 | 5/2010 | Hubbard et al. | |
| 2010/0192196 A1 | 7/2010 | Lee | |
| 2012/0047461 A1 | 2/2012 | Colvin et al. | |
| 2013/0042294 A1 | 2/2013 | Colvin et al. | |
| 2014/0283065 A1* | 9/2014 | Teddy | H04L 63/145 726/23 |
| 2014/0310254 A1 | 10/2014 | Hom et al. | |

FOREIGN PATENT DOCUMENTS

WO 2017003590 1/2017

OTHER PUBLICATIONS

International Search Report and Written Opinion in International Application No. PCT/US2016/033994 mailed Aug. 29, 2016; 9 pages.

* cited by examiner

*Primary Examiner* — Brandon Hoffman
(74) *Attorney, Agent, or Firm* — Patent Capital Group

(57) ABSTRACT

There is disclosed in an example a computing apparatus, including: a process deprivilging engine operable for: recognizing that a process has an undetermined reputation; intercepting a first access request directed to a first resource; determining that the first resource is not owned by the process; and at least partially blocking access to the first resource. There is further disclosed a method of providing the process deprivileging engine, and one or more computer-readable mediums having stored thereon executable instructions for providing the process deprivileging engine.

21 Claims, 6 Drawing Sheets

TEMPORARY PROCESS DEPRIVILEGING

BACKGROUND

This disclosure relates in general to the field of computer security, and more particularly, though not exclusively to, a system and method for temporary process deprivileging of unknown processes.

Many modern operating systems have a concept of "privileges," in which certain objects such as processes are granted specific privileges based on attributes of the files themselves, and on the identity of the processes and the user who launched the process. Examples of privileges include read, write, list (for directories), and execute (for executable files or scripts). In many cases, these are manually assigned by a system administrator, via commands like the Unix "chmod" (change mode) command, or they are inherited from a parent file or directory.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
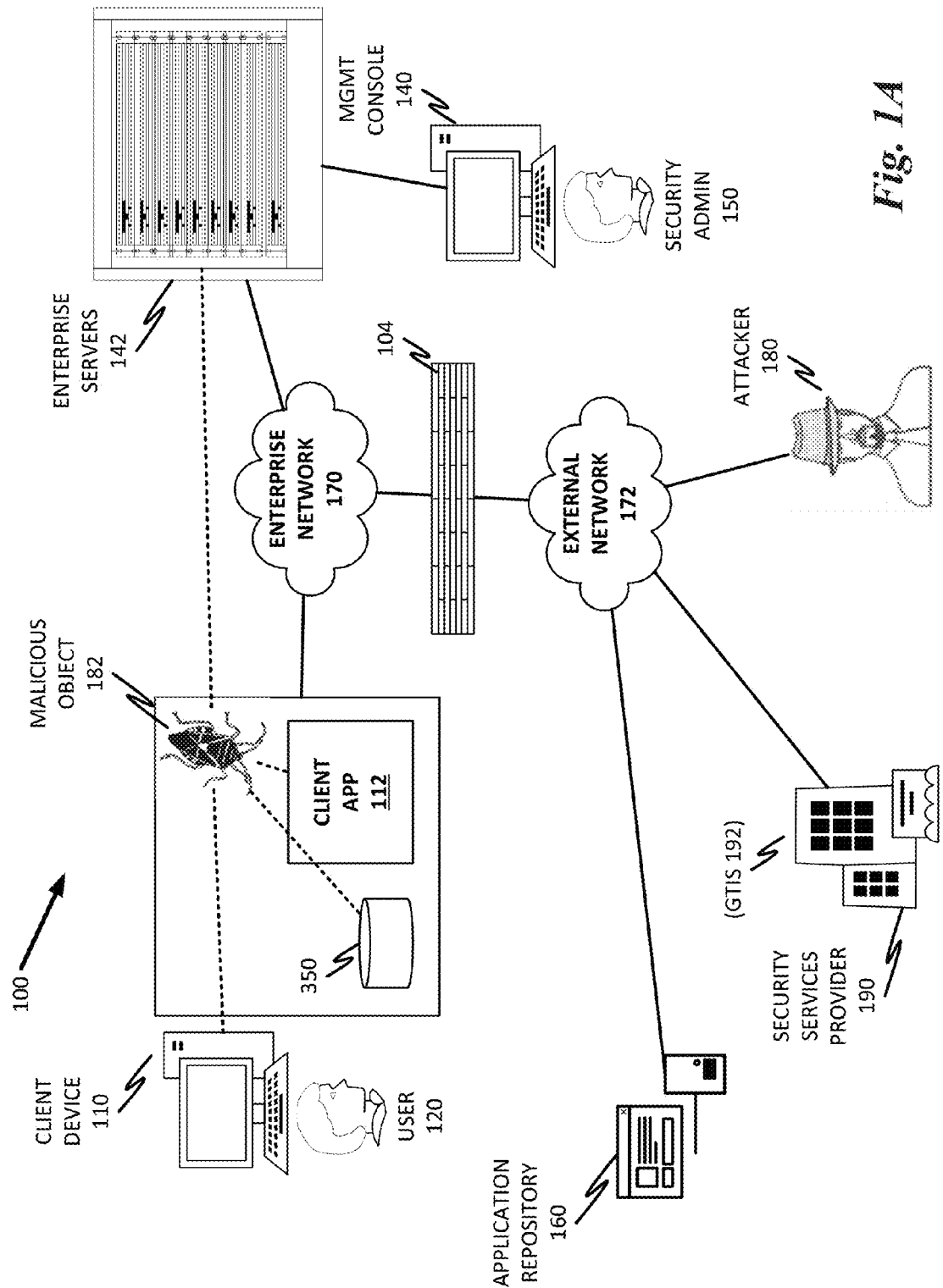
FIG. 1A is a block diagram of a security-enabled network according to one or more examples of the present specification.

There is disclosed in an example a computing apparatus, including: a process deprivilging engine operable for: recognizing that a process has an undetermined reputation; intercepting a first access request directed to a first resource; determining that the first resource is not owned by the process; and at least partially blocking access to the first resource. There is further disclosed a method of providing the process deprivileging engine, and one or more computer-readable mediums having stored thereon executable instructions for providing the process deprivileging engine.

EMBODIMENTS OF THE DISCLOSURE

Enterprise security is an ever-evolving arms-race between "hackers" and "crackers" on the one hand, and security researchers and personnel on the other hand. Because threats evolve quickly, it is important for security firms and security solutions to be agile in not only responding to, but also anticipating new attack vectors.

One useful technology is threat intelligence databases. In one example, a global threat intelligence service (GTIS) operated by a security services provider and enterprise threat intelligence service (ETIS) operated within the enterprise work together to provide reputations for objects encountered on an enterprise network. In an example, each reputation may be a scalar value, with increasing values representing increasing trust.

The system and method of the present specification provide a dynamic and robust solution to the containment and mitigation of potential infections when users are accessing or executing unsecure resources (e.g. unknown applications, documents, websites, etc.). In many cases, these unsecured resources may be "one-off" encounters, or may otherwise lack reliable enterprise reputations. The ETIS may query GTIS to see if the security services provider has other recorded encounters with the object. However, even a reputation value from the GTIS may not be completely reliable for the enterprise, as different enterprises may treat the same object differently. To provide just one example, a gaming website may be reputable and legitimate. In the context of a gaming periodical, access to such a website is beneficial to the business. But in the context of an accounting firm, the gaming website may be considered simply a time waster with no legitimate connection to business activities. Thus, the two enterprises may assign vastly different reputations to the same object.

Certain existing solutions to the issue of privileges for object with unknown reputations may supplement and interact with the teachings of the present specification. For example:

a. Sandbox/Virtualization: executes the user activities in isolated virtual environments (e.g. virtual machines or sandboxes) to prevent infecting the host system. Note, however, that sandboxing is resource intensive, and often must be performed on an external security appliance.

b. Behavioral monitoring and blocking: continuously monitors the program runtime behavior and blocks (or terminates) the program, when malicious behaviors are detected. However, it should be noted that an infected system may return false negatives, and if a malware object is able to act against he system, it can be tricky to "roll back" the changes without drastic measures like a fresh OS install.

The present specification describes a system and method for process containment and mitigation by temporarily restricting the access privileges of an unsecure or uknown operation to the read-only mode. This enables the process to continue reading all non-sensitive system resources, and thus operating. However, unless explicitly approved by the end user or a security administrator, any write accesses or read access to critical system resources are captured, inspected, and denied. Once the new object gains a sufficiently trusted reputation, the process containment can be easily removed by restoring the process privilege back to the normal level.

Advantageously, this method is secure, dynamic, and light weight.

a. Secure: By restricting access privileges to read only, the integrity of the host systems is maintained because uknown processes are unable to silently make persistent modifications.

b. Dynamic: An unknown process's privilege can be limited and restored dynamically without affecting the normal functionality of the program. For example, the privileges of a browser process can be reduced while a user is visiting an unknown or unsecured website. The privileges can later be restored, after the unsecure page has been closed.

c. Light weight: Compared to solutions like sandboxing, this method is light weight and can be deployed in mobile devices with limited CPU and power capabilities.

A system and method according to the present specification will now be described with more particular reference to the attached figures. Throughout the figures, common labels are intended to refer to common or similar elements, though this is not intended to imply a particular relationship between the various views and figures. In some instances, a hyphenated label (such as 10-2 or 10-2) may be used to refer to an example or species of a generic element 10.

FIG. 1A is a network-level diagram of a secured enterprise 100 according to one or more examples of the present specification. In the example of FIG. 1A, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computes, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. It should also be noted that some functionality of endpoint devices 120 may also be provided via workload cluster 142. For example, one microcloud may provide a remote desktop hypervisor such as a Citrix workspace, which allows users 120 operating endpoints 120 to remotely login to a remote enterprise desktop and access enterprise applications, workspaces, and data. In that case, endpoint 120 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 122 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 1B:
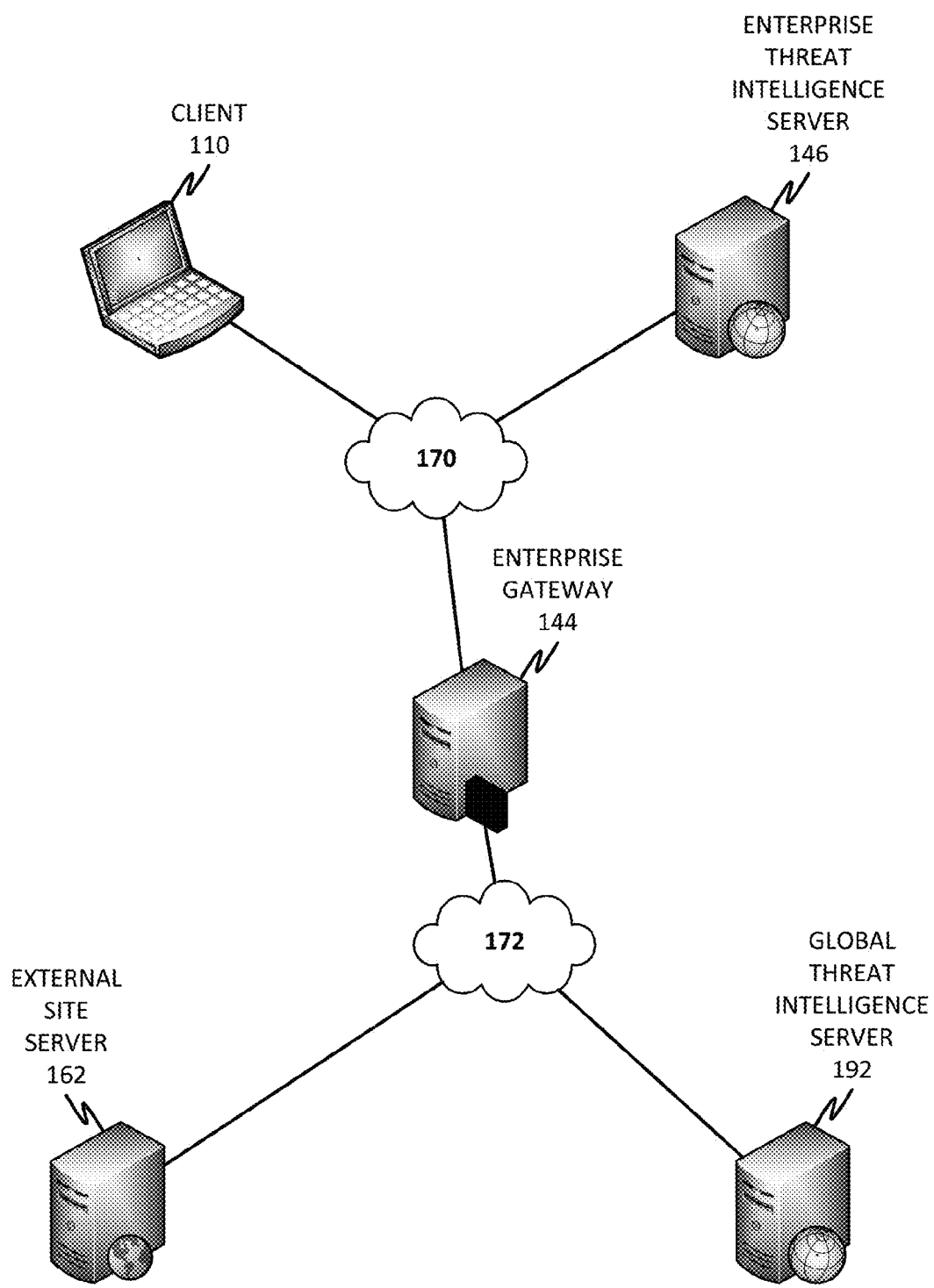
FIG. 1B is a block diagram illustrating additional details of the network of FIG. 1A.

FIG. 1B illustrates additional details of the network of FIG. 1A. In FIG. 1B, several devices are illustrated performing discrete functions. It should be understood, however, that these are logical functions, and are not intended to require a particular physical configuration or network layout. In various embodiments, a single physical device may provide multiple logical functions, while in the same or different embodiments, a logical function may be split between multiple physical devices. It should also be understood that one or more of the functions described herein may be provided by a single-purpose appliance, or by a virtual appliance operating on workload cluster 142.

In this example, enterprise network 170 is managed by an enterprise gateway 144 (EGW), which provides gateway services for devices, such as client devices 110, connected to enterprise network 170. Enterprise devices communicatively couple to external devices via external network 172, which may be the Internet.

In this example, GTIS 192 is configured to provide global reputations for network objects, such as when client 110 attempts to access external site server 162. ETIS 146 may also provide enterprise-class reputations. These may be derived in part from queries to GTIS 192, though ETIS 146 may apply enterprise-specific logic for assigning a reputation.

Figure 2:
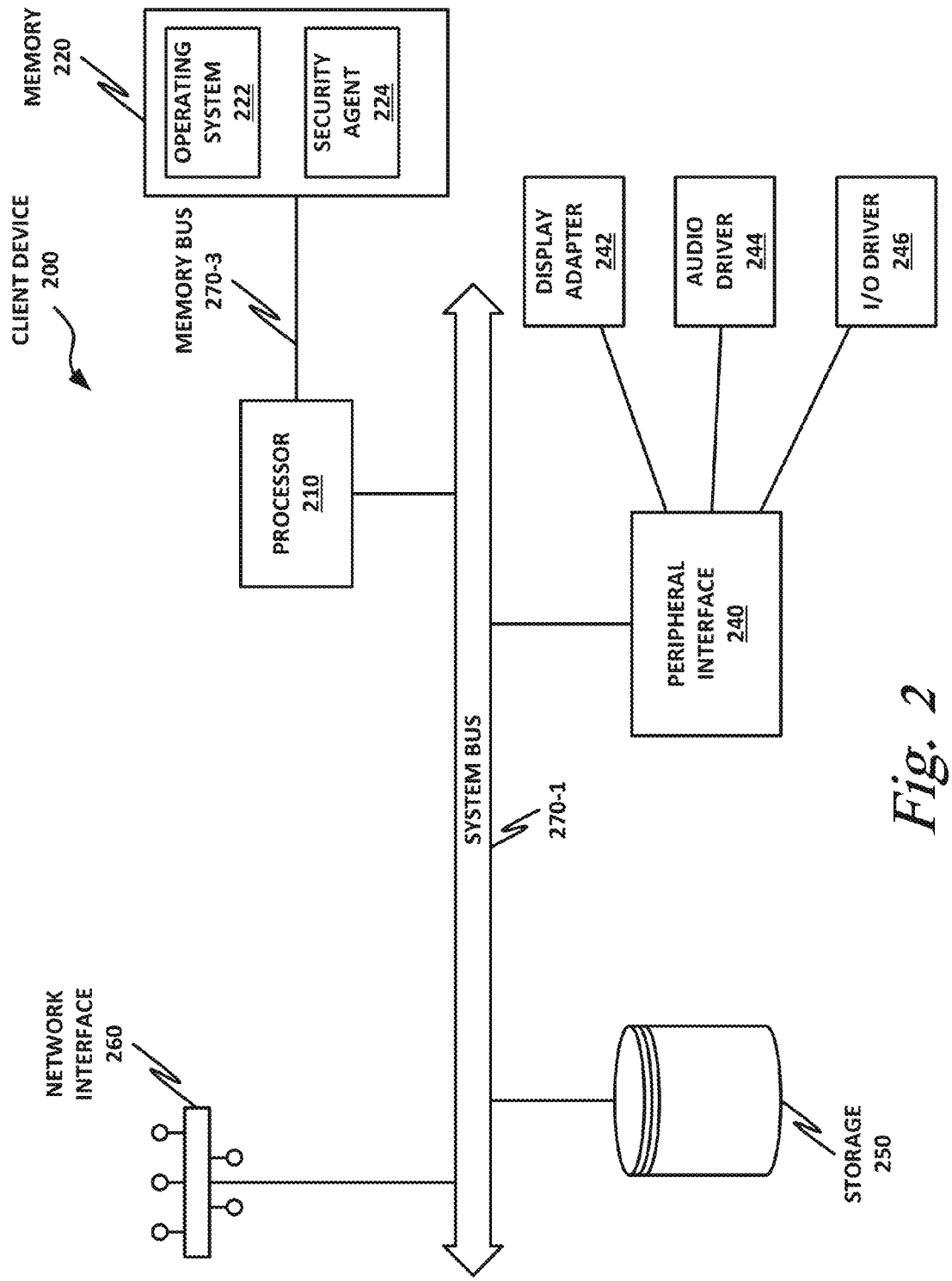
FIG. 2 is a block diagram of a client device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a security agent 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security agent 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security agent 224, in one example, is operable to carry out computer-implemented methods as described in this specification. Security agent 224 may include one or more tangible non-transitory computer-readable mediums having stored thereon executable instructions operable to instruct a processor to provide a security agent 224. As used throughout this specification, an "engine" includes any combination of one or more logic elements, of similar or dissimilar species, operable for and configured to perform one or more methods provided by the engine. Thus, security agent 224 may comprise one or more logic elements configured to provide methods as disclosed in this specification. In some cases, security agent 224 may include a special integrated circuit designed to carry out a method or a part thereof, and may also include software instructions operable to instruct a processor to perform the method. In some cases, security agent 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security agent 224 may also include other hardware and software, including configuration files, registry entries, and interactive or user-mode software by way of non-limiting example.

In one example, security agent 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of security agent 224 to provide the desired method.

Security agent 224 may be adapted to provide security services for client devices 200. This may include antivirus, antimalware, and other similar services consistent with this specification. These may further include enforcing URL reputation policies for enterprise 100. For example, when client device 200 encounters a URL, or when a user attempts to download a file from a URL, security agent 224 may take appropriate action to allow or block the attempt. In some cases, security agent 224 may need to request a reputation for the URL before acting. In other cases, enforcement is decentralized. For example, when client device 200 attempts to access a URL, the request may necessarily pass through EGW 144, which enforces the policy at its end.

In some embodiments security agent 224 requests a reputation whenever it encounters a new object, such as a URL. The response may include a reputation, as well as a TTL. Client device 200 may then cache the reputation until the TTL expires, at which case it purges the stale reputation. In other embodiments, an enterprise service bus (ESB), such as McAfee's data exchange layer (DXL) may be provided with a publish-subscribe framework. In that case, client device 200 may subscribe to reputation updates on the ESB, and may cache reputations as they are published.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digial outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
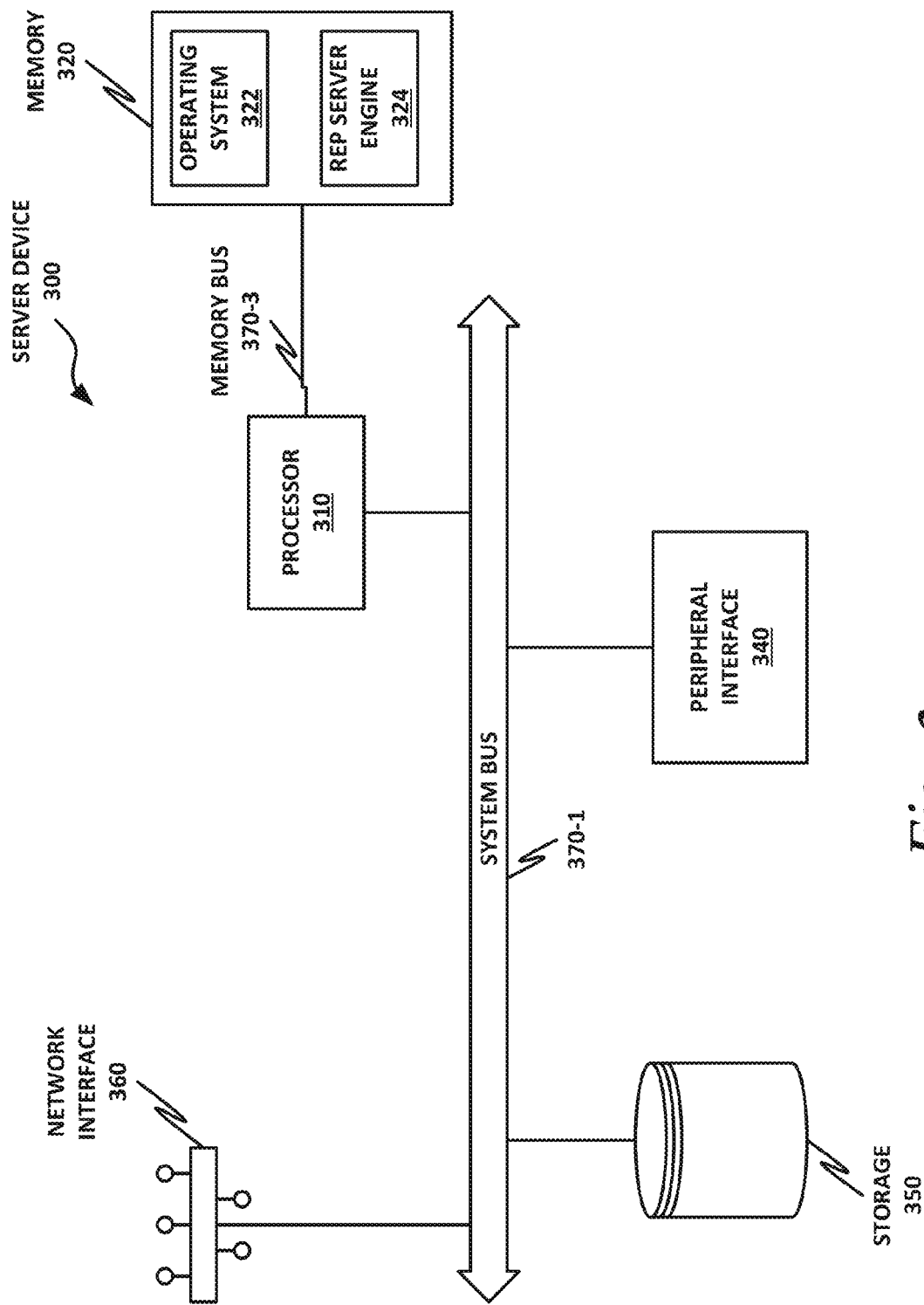
FIG. 3 is a block diagram of a server device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a reputation server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of reputation server engine 324.

Network interface 360 may be provided to communicatively couple server 140 to a wired or wireless network, and may include one or more logic elements as described in FIG. 2.

Reputation server engine 324 is an engine as described in FIG. 2 and, in one example, includes one or more logic elements operable to carry out computer-implemented methods as described in this specification. Software portions of reputation server engine 324 may run as a daemon process.

Reputation server engine 324 may include one or more non-transitory computer-readable mediums having stored thereon executable instructions operable to instruct a processor to provide a security agent. At an appropriate time, such as upon booting server 140 or upon a command from operating system 322 or a user 120 or security administrator 150, processor 310 may retrieve a copy of reputation server engine 324 (or software portions thereof) from storage 350 and load it into memory 320. Processor 310 may then iteratively execute the instructions of reputation server engine 324 to provide the desired method.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users. In one example, reputation server engine 324 is provided within or as a function of ETIS 146.

Figure 4:
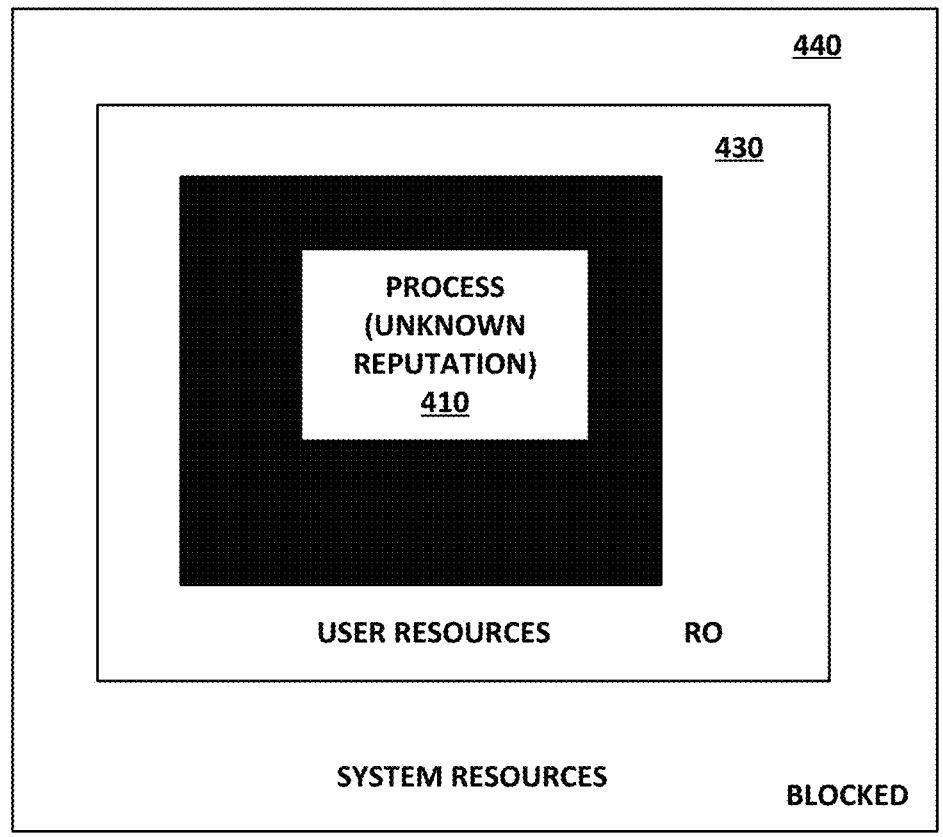
FIG. 4 is a block diagram of a privilege schema according to one or more examples of the present specification.

FIG. 4 is a block diagram of a resource privilege model according to one or more examples of the present specification. In this example, process 410 has an unknown reputation, and is thus considered unsecured. It is beneficial to place at least some level of restriction on the privileges of processor 410 until a reputation can be more fully established.

In this example, resources 420 are owned by process 410. This means that these are localized resources, for example, that are created and used solely by process 410. They do not affect the functionality of other system processes, and process 410 may safely be granted read/write access to resources 420.

One level up, resources 430 are user resources. These are resources that are owned by the user who launched process 410, but are not owned by process 410 itself. Thus, in this example, process 410 is granted read only access to user resources 430.

Resources 440 are system resources. System resources require the highest privilege level, and thus access to system resources 440 may be completely blocked for process 410. Note however that this model may be configurable, and certain system resources may be designated as "read-only" at least, so that the untrusted process can operate properly.

This model may help to ensure that process 410 has little or no ability to perform malicious actions until it has been verified and moved into a more trusted state. Verification can take the form of running in a sandbox environment, detailed static analysis analysis, detailed dynamic analysis, or any other suitable analysis means.

Figure 5:
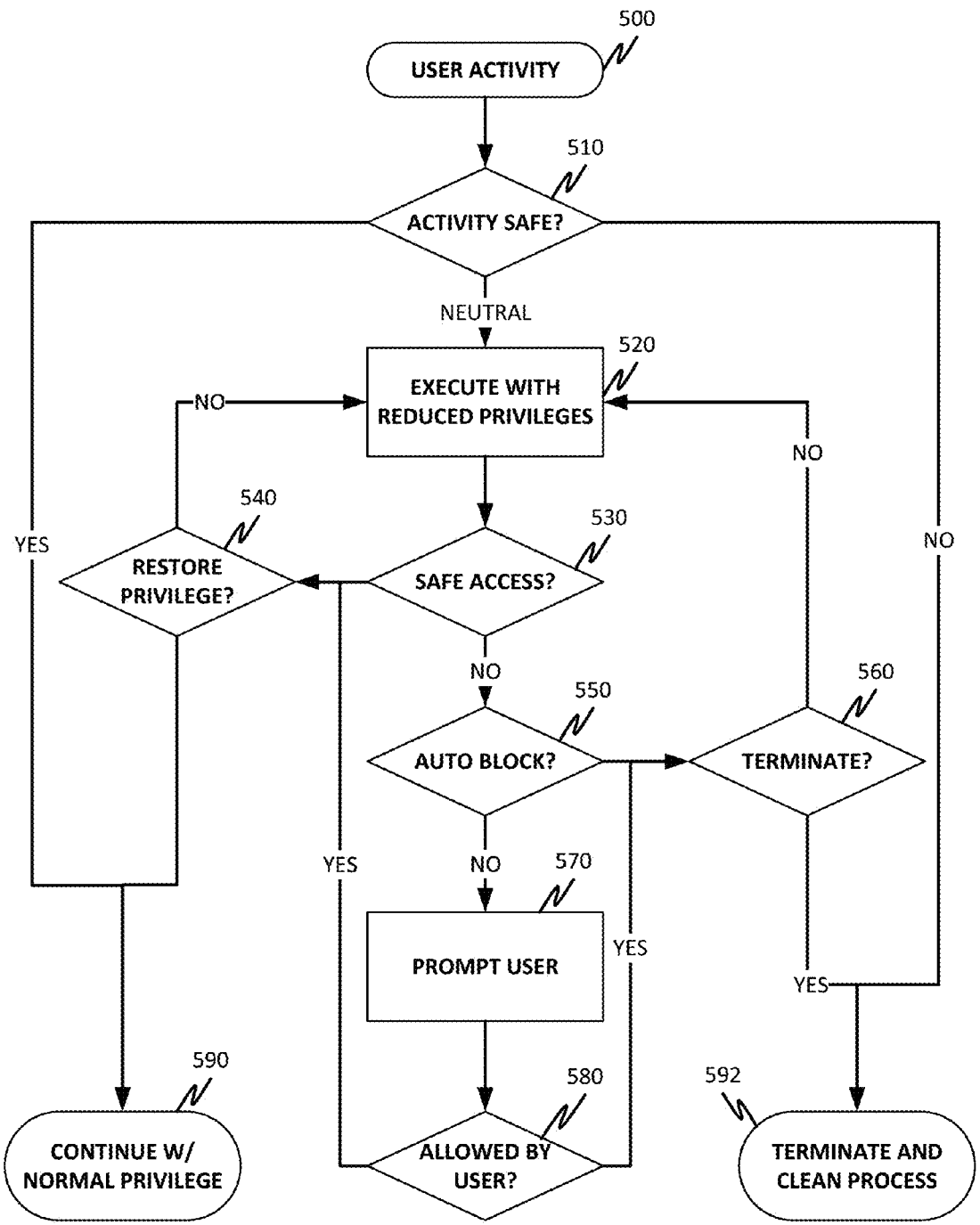
FIG. 5 is a flow chart of a method performed by a security agent according to one or more examples of the present specification.

FIG. 5 is a flowchart of a process 500 performed by security agent 224.

In block 500, a user 120 initiates a user activity. By way of example, the user activity may have security implications (such as file write, file execution, document read, Internet browse, etc.).

In decision block 510, security agent 224 determines whether the activity is considered safe.

If the activity is considered known unsafe, then control passes immediately to block 592, where security agent 224 terminates and cleans the process.

Conversely, if the activity is considered known safe, then control passes directly to block 590, and the process continues with normal privileges.

These two paths from block 510 may represent objects that already have existing reputations. If the reputation is known "good" or "trusted," then the application may safely be allowed to execute with ordinary privileges. Conversely, if the reputation is known "bad" or "untrusted," then the process should be immediately terminated and cleaned.

A third option from block 510 is that the process is considered "neutral," "unknown," or "gray." In that state, the process does not yet have an established reputation. Rather than block the unknown process, in block 520, security agent 224 may permit the unknown process to executed with restricted or reduced privileges until its trustworthiness is established. In this mode, unnecessary privilege tokens may be stripped. In one example, most read requests are permitted, except to read requests to sensitive data. On the other hand, unless overridden by rules, most file and registry write requests may be treated as unsafe. Furthermore, all thread and process creation requests may be deemed as unsafe until the process is trusted.

As the process is executing, security agent 224 may monitor accesses that are made by the process. If the access is safe (as explained above), then it may be permitted. Furthermore, based on internal rules, local flags, an explicit signal from user 120 or security administrator 150, or from suitable input, in block 540, the full privileges may be restored. This may be appropriate for a process that is now trusted.

If the privileges are not restored, then control passes back to block 520, and the process continues to execute with reduced privileges.

Conversely, if the user or administrator chooses restore the privileges, then control passes to block 590, and the process continues with normal privileges.

Returning to decision block 530, if the access is not considered safe, then in decision block 550, security agent 224 checks to see whether an auto block option is selected. If an access is blocked, the system may either terminate the process, or silently take away the write permission so that the program can continue execution.

Depending on settings, unsafe access requests may either be automatically blocked, or the user may be alerted for an input. If auto block is selected, then control passes to block 560. In decision block 560, a user or administrator has the option to terminate the process.

If the user or administrator opts to terminate the process, then control passes to block 592, and security agent 224 terminates and cleans the process. Conversely, if the user opts not to terminate the process, then control passes back to block 520. The process then continues running with reduced privileges.

Returning to decision block 550, if the auto block flag is not set, then in block 570, security agent 224 may prompt the user or security administrator for permission.

In decision block 580, if the user or administrator allows the action, then control passes to block 540. If the activity becomes trusted (either by a GTIS-provided reputation, an ETIS-provided reputation, or explicit user input), the process privilege are restored in block 540 so that the process can execute in its normal mode.

If the user or administrator does not allow the process, then control passes to block 560. If an access is allowed, the system will reevaluate the user activity The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (poast-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in one example, a computing apparatus, comprising: a process deprivilging engine operable for: recognizing that a process has an undetermined reputation; intercepting a first access request directed to a first resource; determining that the first resource is not owned by the process; and at least partially blocking access to the first resource.

There is further disclosed an example wherein the process deprivileging engine is further operable for: intercepting a second access request directed to a second resource; determining that the second resource is owned by the process; and permitting access to the second resource.

There is further disclosed an example wherein the process deprivileging engine is further operable for: intercepting a third access request directed to a third resource; determining that the third resource is owned by a user owning the process, and that the resource is not owned by the process; and permitting read-only access to the third resource.

There is further disclosed an example wherein the process deprivileging engine is further operable for determining that the first access request is a safe access, and restoring privileges to the process.

There is further disclosed an example wherein the process deprivileging engine is further operable for determining that the first access request is an auto-blocked access, and terminating the process.

There is further disclosed an example wherein the process deprivileging engine is further operable for prompting a user for a verification input, receiving an affirmative response, and restoring privileges to the process.

There is further disclosed an example wherein the process deprivileging engine is further operable for prompting a user for a verification input, receiving a negative response, and terminating the process.

There is further disclosed in an example one or more tangible, non-transitory computer-readable mediums having stored thereon executable instructions for providing a deprivileging engine operable for: recognizing that a process has an undetermined reputation; intercepting a first access request directed to a first resource; determining that the first resource is not owned by the process; and at least partially blocking access to the first resource.

There is further disclosed an example wherein the process deprivileging engine is further operable for: intercepting a second access request directed to a second resource; determining that the second resource is owned by the process; and permitting access to the second resource.

There is further disclosed an example wherein the process deprivileging engine is further operable for: intercepting a third access request directed to a third resource; determining that the third resource is owned by a user owning the process, and that the resource is not owned by the process; and permitting read-only access to the third resource.

There is further disclosed an example wherein the process deprivileging engine is further operable for determining that the first access request is a safe access, and restoring privileges to the process.

There is further disclosed an example wherein the process deprivileging engine is further operable for determining that the first access request is an auto-blocked access, and terminating the process.

There is further disclosed an example wherein the process deprivileging engine is further operable for prompting a user for a verification input, receiving an affirmative response, and restoring privileges to the process.

There is further disclosed an example wherein the process deprivileging engine is further operable for prompting a user for a verification input, receiving a negative response, and terminating the process.

There is further disclosed an example of a computer-implemented method of providing a process deprivileging engine, comprising: recognizing that a process has an undetermined reputation; intercepting a first access request directed to a first resource; determining that the first resource is not owned by the process; and at least partially blocking access to the first resource.

There is further disclosed an example further comprising: intercepting a second access request directed to a second resource; determining that the second resource is owned by the process; and permitting access to the second resource.

There is further disclosed an example further comprising: intercepting a third access request directed to a third resource; determining that the third resource is owned by a user owning the process, and that the resource is not owned by the process; and permitting read-only access to the third resource.

There is further disclosed an example further comprising determining that the first access request is a safe access, and restoring privileges to the process.

There is further disclosed an example of one or more tangible, non-transitory computer-readable storage mediums having stored thereon executable instructions for instructing one or more processors for providing a reputation engine operable for performing any or all of the operations of the preceding examples.

There is further disclosed an example of a method of providing a reputation engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
   a process deprivileging engine operable for:
   recognizing that a process has an undetermined reputation;
   intercepting a first access request by the process directed to a first resource;
   determining that the first resource is not owned by the process; and
   based at least in part on the undetermined reputation and the determination that the first resource is not owned by the process, at least partially blocking access to the first resource.

2. The computing apparatus of claim 1, wherein the process deprivileging engine is further operable for:
   intercepting a second access request directed to a second resource;
   determining that the second resource is owned by the process; and
   permitting access to the second resource.

3. The computing apparatus of claim 1, wherein the process deprivileging engine is further operable for:
   intercepting a third access request directed to a third resource;
   determining that the third resource is owned by a user owning the process, and that the resource is not owned by the process; and
   permitting read-only access to the third resource.

4. The computing apparatus of claim 1, wherein the process deprivileging engine is further operable for determining that the first access request is a safe access, and restoring privileges to the process.

5. The computing apparatus of claim 1, wherein the process deprivileging engine is further operable for determining that the first access request is an auto-blocked access, and terminating the process.

6. The computing apparatus of claim 1, wherein the process deprivileging engine is further operable for prompting a user for a verification input, receiving an affirmative response, and restoring privileges to the process.

7. The computing apparatus of claim 1, wherein the process deprivileging engine is further operable for prompting a user for a verification input, receiving a negative response, and terminating the process.

8. One or more tangible, non-transitory computer-readable mediums having stored thereon executable instructions for providing a deprivileging engine operable for:
   recognizing that a process has an undetermined reputation;
   intercepting a first access request by the process directed to a first resource;
   determining that the first resource is not owned by the process; and
   based at least in part on the undetermined reputation and the determination that the first resource is not owned by the process, at least partially blocking access to the first resource.

9. The one or more tangible, non-transitory computer-readable storage mediums of claim 8, wherein the process deprivileging engine is further operable for:
   intercepting a second access request directed to a second resource;
   determining that the second resource is owned by the process; and
   permitting access to the second resource.

10. The one or more tangible, non-transitory computer-readable storage mediums of claim 8, wherein the process deprivileging engine is further operable for:
    intercepting a third access request directed to a third resource;
    determining that the third resource is owned by a user owning the process, and that the resource is not owned by the process; and
    permitting read-only access to the third resource.

11. The one or more tangible, non-transitory computer-readable storage mediums of claim 8, wherein the process deprivileging engine is further operable for determining that the first access request is a safe access, and restoring privileges to the process.

12. The one or more tangible, non-transitory computer-readable storage mediums of claim 8, wherein the process deprivileging engine is further operable for determining that the first access request is an auto-blocked access, and terminating the process.

13. The one or more tangible, non-transitory computer-readable storage mediums of claim 8, wherein the process deprivileging engine is further operable for prompting a user for a verification input, receiving an affirmative response, and restoring privileges to the process.

14. The one or more tangible, non-transitory computer-readable storage mediums of claim 8, wherein the process deprivileging engine is further operable for prompting a user for a verification input, receiving a negative response, and terminating the process.

15. A computer-implemented method of providing a process deprivileging engine, comprising:
    recognizing that a process has an undetermined reputation;
    intercepting a first access request by the process directed to a first resource;
    determining that the first resource is not owned by the process; and
    based at least in part on the undetermined reputation and the determination that the first resource is not owned by the process, at least partially blocking access to the first resource.

16. The computer-implemented method of claim 15, further comprising:
    intercepting a second access request directed to a second resource;
    determining that the second resource is owned by the process; and
    permitting access to the second resource.

17. The computer-implemented method of claim 15, further comprising:

intercepting a third access request directed to a third resource;

determining that the third resource is owned by a user owning the process, and that the resource is not owned by the process; and permitting read-only access to the third resource.

18. The computer-implemented method of claim 15, further comprising determining that the first access request is a safe access, and restoring privileges to the process.

19. The computer-implemented method of claim 15, further comprising determining that the first access request is an auto-blocked access, and terminating the process.

20. The computer-implemented method of claim 15, further comprising prompting a user for a verification input, receiving an affirmative response, and restoring privileges to the process.

21. The computer-implemented method of claim 15, further comprising prompting a user for a verification input, receiving a negative response, and terminating the process.

* * * * *

UNITED STATES PATENT AND TRADEMARK OFFICE
CERTIFICATE OF CORRECTION

PATENT NO. : 9,723,006 B2  
APPLICATION NO. : 14/752902  
DATED : August 1, 2017  
INVENTOR(S) : Zheng Zhang et al.

Page 1 of 1

It is certified that error appears in the above-identified patent and that said Letters Patent is hereby corrected as shown below:

On the Title Page

In item (57), in Column 2, in "Abstract", Line 2, delete "deprivilging" and insert -- deprivileging --, therefor.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*